US012238499B2

(12) United States Patent
Yang et al.

(10) Patent No.: US 12,238,499 B2
(45) Date of Patent: Feb. 25, 2025

(54) SOUNDING UNIT

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignees: AAC Microtech (Changzhou) Co., Ltd., Changzhou (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 216 days.

(21) Appl. No.: 17/974,508

(22) Filed: Oct. 26, 2022

(65) Prior Publication Data

US 2023/0328449 A1 Oct. 12, 2023

(30) Foreign Application Priority Data

Apr. 6, 2022 (CN) ......................... 202220769149.6

(51) Int. Cl.

| | |
|---|---|
| ***H04R 9/06*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 7/127* (2013.01); *H04R 7/18* (2013.01); *H04R 9/025* (2013.01); *H04R 9/045* (2013.01); *H04R 2400/11* (2013.01)

(58) Field of Classification Search

CPC . H04R 9/06; H04R 7/127; H04R 7/18; H04R 9/025; H04R 9/045; H04R 2400/11

See application file for complete search history.

(56) References Cited

U.S. PATENT DOCUMENTS

2020/0204923 A1* 6/2020 Song ........................ H04R 7/16
2022/0174384 A1* 6/2022 Song ...................... H04R 1/026

* cited by examiner

*Primary Examiner* — Sunita Joshi
(74) *Attorney, Agent, or Firm* — W&G Law Group

(57) ABSTRACT

The sounding unit provided by the present invention includes a frame, a vibration system and a magnetic circuit system. The vibration system includes a diaphragm, a voice coil and an FPC. The diaphragm consists of a dome with a protruded platform and a suspension. The FPC includes an internal fixed part, an external fixed part, and an elastic part. The internal fixed part includes a first fixed part, a second fixed part, and a third fixed part. The voice coil includes an upper end surface and a lower end surface. The upper end surface is fixed to the protruded platform. The lower end surface is fixed to the third fixed part. The bonding strength between the FPC and the voice coil in the sounding unit is improved, and the vibration stability of the sounding unit is enhanced.

9 Claims, 7 Drawing Sheets

SOUNDING UNIT

FIELD OF THE PRESENT DISCLOSURE

The present invention relates to the field of electro-acoustic transducers, and in particular relates to sounding unit.

DESCRIPTION OF RELATED ART

With the development of electronic technology, portable consumer electronic products are more and more sought after by people, such as mobile phones, handheld game consoles, navigation devices or handheld multimedia entertainment devices. sounding unit is widely used in these consumer electronic products. Such a wide range of applications requires the sounding unit to have excellent performance and long service life.

The related art sounding unit includes a housing, a vibration system and a magnetic circuit system. The magnetic circuit system usually includes yoke and magnet. The vibration system usually includes voice coil, voice coil skeleton and diaphragm and FPC. The voice coil is fixed in the magnetic gap of the magnetic circuit system through the voice coil skeleton. The FPC can also be used to support the voice coil while being electrically connected to the voice coil.

However, the application of the voice coil skeleton in the related art will increase the weight of the vibration system, which is not conducive to the vibration and sound performance of the diaphragm, and the FPC is usually glued to the side surface of the voice coil. Risk of separation between the FPC and the voice coil exists, which affects the sounding performance and reliability of the sounding unit.

Therefore, it is necessary to provide a new sounding unit to solve the above problems.

SUMMARY OF THE PRESENT INVENTION

Based on the above problems, the present invention proposes a sounding unit with good sounding performance and high reliability.

The sounding unit provided by the present invention includes a frame, a vibration system and a magnetic circuit system. The vibration system includes a diaphragm, a voice coil and a FPC. The diaphragm consists of a dome and a suspension, the dome is provided with a protruded platform formed by a depression towards the voice coil. The FPC includes an internal fixed part fixed to the voice coil, an external fixed part on the basic stand, and an elastic part that connects the internal fixed part and the external fixed part. The internal fixed part includes a first fixed part connected with the elastic part, a second fixed part bent and extended from the first fixed part to the direction away from the diaphragm, and a third fixed part bent and extended from the end of the second fixed part away from the first fixed part toward the voice coil. The voice coil includes an upper end surface facing the diaphragm and a lower end surface away from the diaphragm. The upper end surface is fixed to the protruded platform. The lower end surface is fixed to the third fixed part. The present invention, the bonding strength between the FPC and the voice coil in the sounding unit is high, and it is not easy to detach, and the vibration stability of the sounding unit is high.

In addition, the lower end surface is fixed to a surface of the third fixed part facing the voice coil.

In addition, a thickness of the voice coil is smaller than a width of the third fixed part.

The second fixed part is spaced apart from the surface of the voice coil away from the magnet to form a glue groove for accommodating glue. The first fixed part, the second fixed part and the third fixed part are integrally formed.

Further, the FPC further includes a fourth fixed part glued to the first fixed part away from the diaphragm; the second fixed part, the third fixed part and the fourth fixed part are integrally formed.

Further, the voice coil includes a plurality of protruded platforms extending along a long axis and a short axis of the voice coil, respectively. In addition, the third fixed part is fixed to a corner position of the voice coil.

In addition, the magnet includes a main magnet located on a middle of the yoke, and an auxiliary magnet arranged on a peripheral side of the main magnet and forming the magnetic gap with the main magnet; the auxiliary magnet includes a first auxiliary magnet along the long axis of the voice coil and a second auxiliary magnet along the short axis of the voice coil; the first auxiliary magnet and the second auxiliary magnet are spaced apart for forming a containment gap for receiving at least a part of the third fixed part.

Further the sounding unit includes a conductive terminal, and a surface of the first fixed part facing the diaphragm includes a welding plate electrically connecting to the voice coil through the conductive terminal.

Compared with the related art, in the sounding unit of the present invention, a protruded platform formed by arranging depression on the dome of the diaphragm is used to fix and support the voice coil. In this way, the voice coil skeleton is not used, the overall weight of the vibration system is reduced, and the sound performance of the sounding unit is improved. In addition, at the position where the FPC and the voice coil are fixed, the second fixed part and third fixed part which bend and extend. The interval between the second fixed part and the side surface of the voice coil is set to form a glue groove for accommodating the glue. The third fixed part carries the bottom of the voice coil. In this way, the voice coil and the FPC is effectively improved, and the risk of separation of the FPC and the voice coil is avoided.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
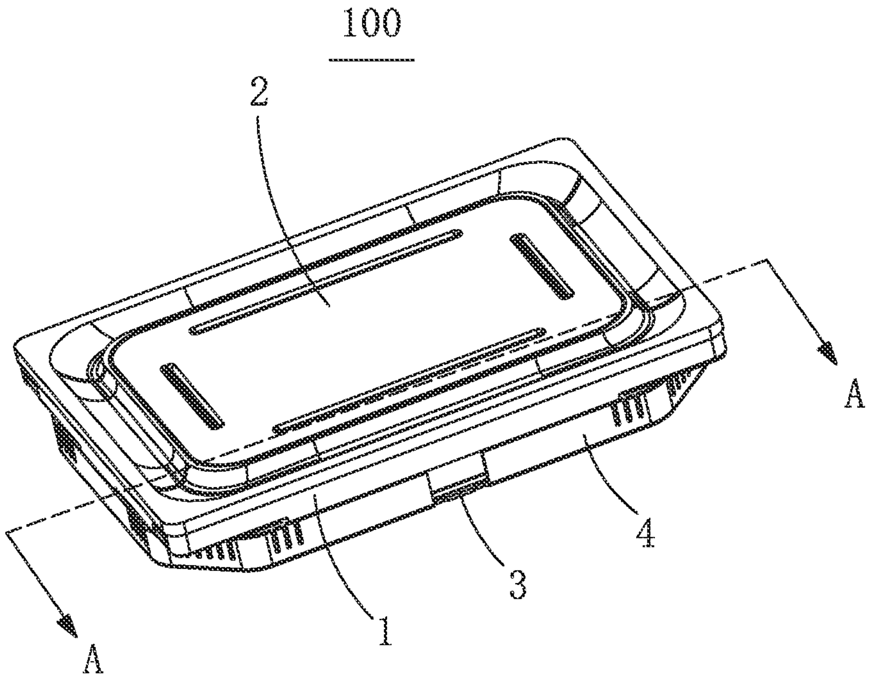
FIG. 1 is an isometric view of a sounding unit in accordance with an exemplary embodiment of the present invention.
Figure 2:
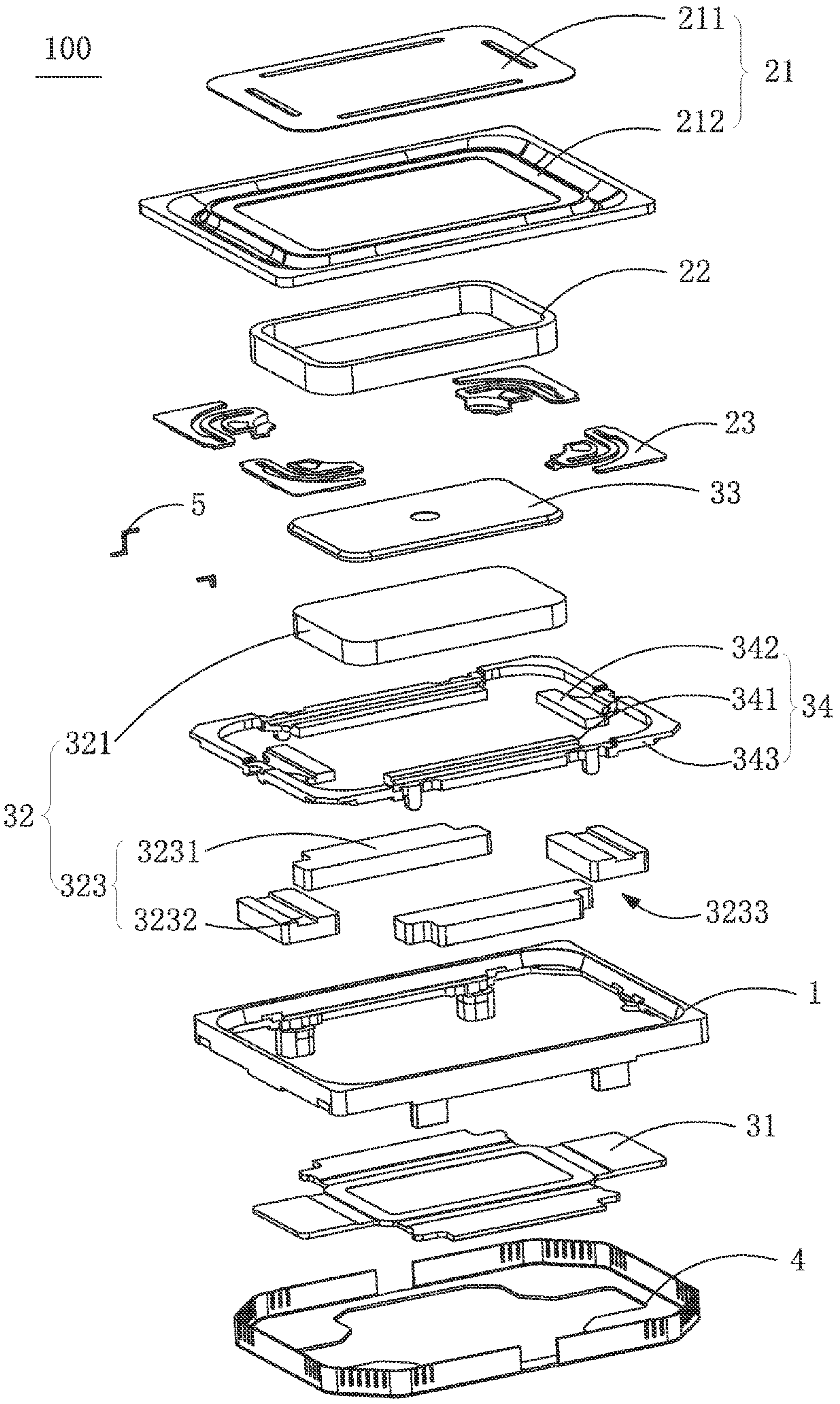
FIG. 2 is an exploded view of the sounding unit in FIG. 1.
Figure 3:
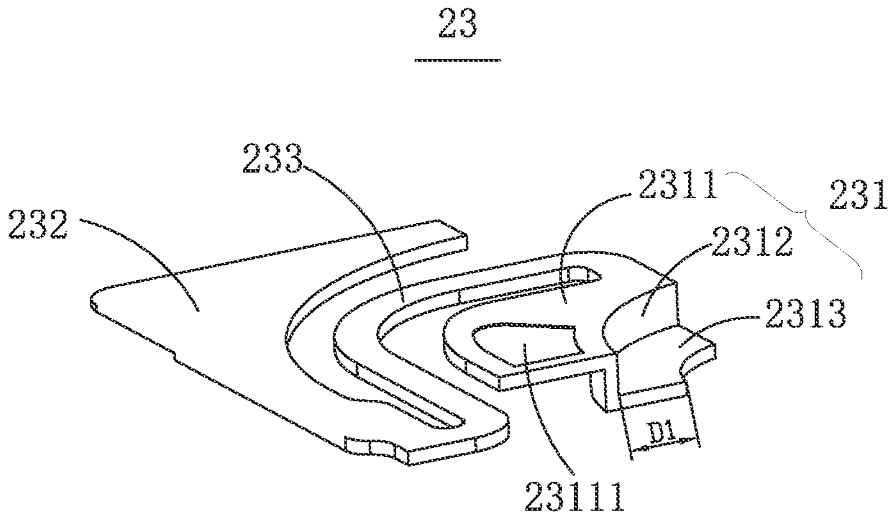
FIG. 3 is an isometric view of an FPC of the sounding unit.
Figure 4:
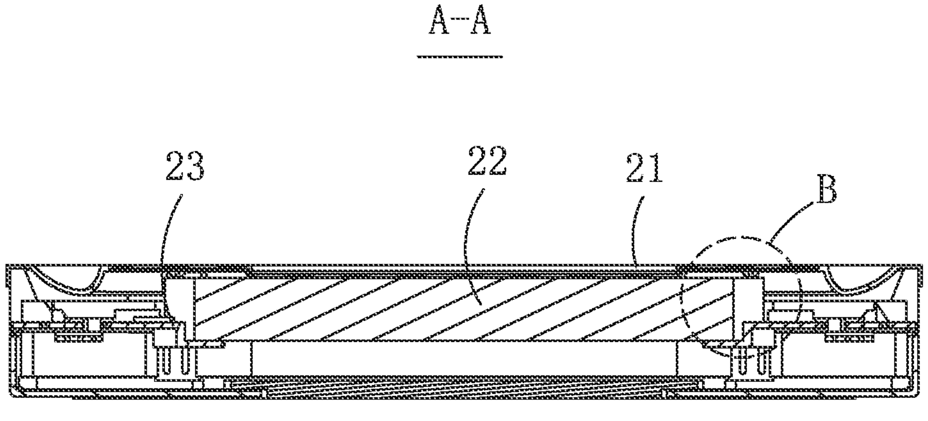
FIG. 4 is a cross-sectional view of the sounding unit taken along line AA in FIG. 1.
Figure 5:
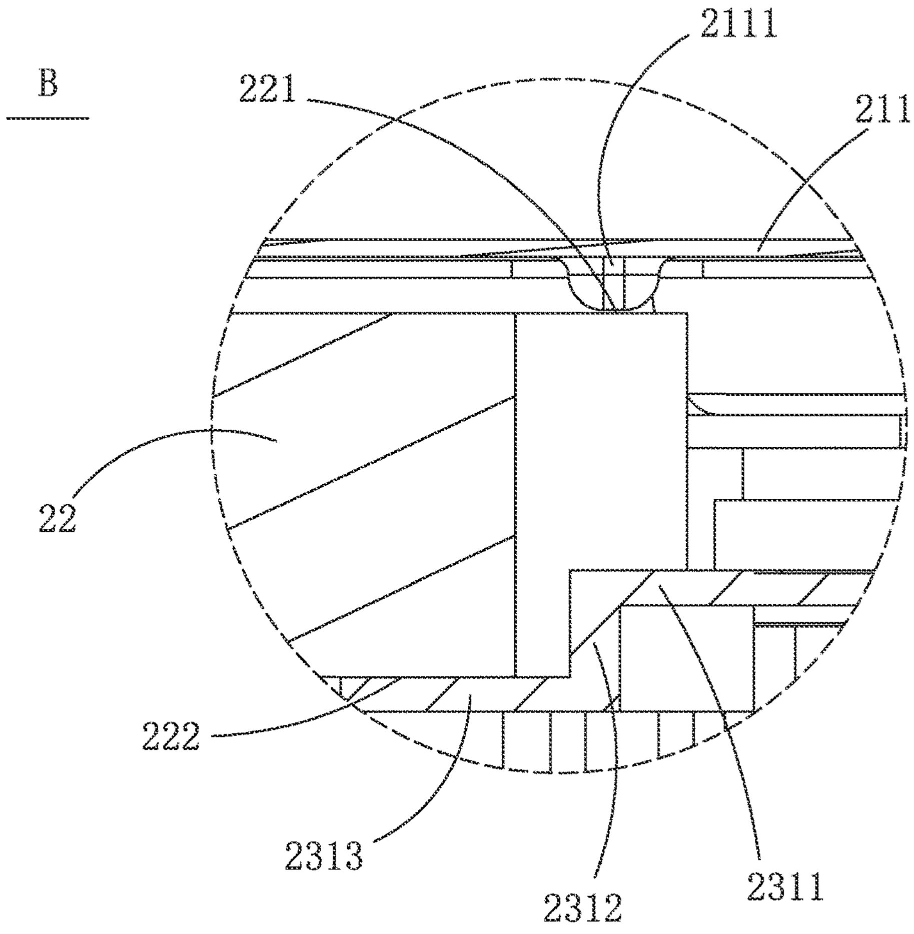
FIG. 5 is an enlarged view of Part B of FIG. 4.

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

As shown in FIGS. 1-7, the present invention provides a sounding unit 100, the sounding unit 100 includes a frame 1 and a vibration system 2 and a magnetic circuit system 3 fixed to the frame 1.

The vibration system 2 includes a diaphragm 21 fixed to the frame 1 and a voice coil 22 fixed to the diaphragm 21. The voice coil 22 drives the diaphragm 21 to vibrate and generate sound, and the voice coil 22 is in the shape of a racetrack.

The magnetic circuit system 3 includes a yoke 31 fixed to the frame 1 and a magnet 32 fixed to the yoke 31. Specifically, the magnet 32 includes a main magnet 321 located in the middle of the yoke 31 and an auxiliary magnet 323 disposed on the peripheral side of the main magnet 321 and forming a magnetic gap with the main magnet 321. Specifically, the auxiliary magnet 323 includes a first auxiliary magnet 3231 along the long axis direction of the voice coil 22, a second auxiliary magnet 3232 along the short axis direction of the voice coil 22.

The first auxiliary magnet 3231 and the second auxiliary magnet 3232 are spaced apart to form a containment gap 3233. The magnetic circuit system 3 further includes a main pole core 33 fixed on the surface of the main magnet 321 facing the diaphragm 21, and an auxiliary pole core 34 fixedly connected to the frame 1. The auxiliary pole core 34 includes a first auxiliary pole core 341 fixed to the first auxiliary magnet 3231 and a second auxiliary pole core 342 fixed to the second auxiliary magnet 3232, a ring-shaped connection element 343 connecting the first auxiliary pole core 341 and the second auxiliary pole core 342. The connection element 343 is fixed to the frame 1.

The sounding unit 100 further includes a steel sheet 4 fixed on the outer side of the yoke 31.

In the vibration system 2, the voice coil 22 is inserted in the magnetic gap, and acts with the magnet 32 after being powered on to drive the diaphragm 21 to vibrate and generate sound. Further, the diaphragm 21 includes a dome 211 in the middle and a suspension 212 surrounding the dome 211. The outer edge of the suspension 212 is fixed to the frame 1. It can be understood that the voice coil 22 includes an upper end surface 221 facing the diaphragm 21 and a lower end surface 222 away from the diaphragm 21. In order to better support the voice coil 22, the dome 211 is provided with a protruded platform 2111 recessed from the surface of the dome 211 away from the voice coil 22 toward the voice coil 22. The upper end surface 221 of the voice coil 22 is fixed on the protruded platform 2111. In the present invention, the dome 211 is directly recessed to form a protruded platform 2111 for fixing the voice coil 22. In this way, avoiding the use of traditional voice coil skeleton not only reduces the use of components, but also reduces production costs. It also reduces the weight of the vibration system 2, which is beneficial to improve the sound performance of the vibration system 2.

Figure 6:
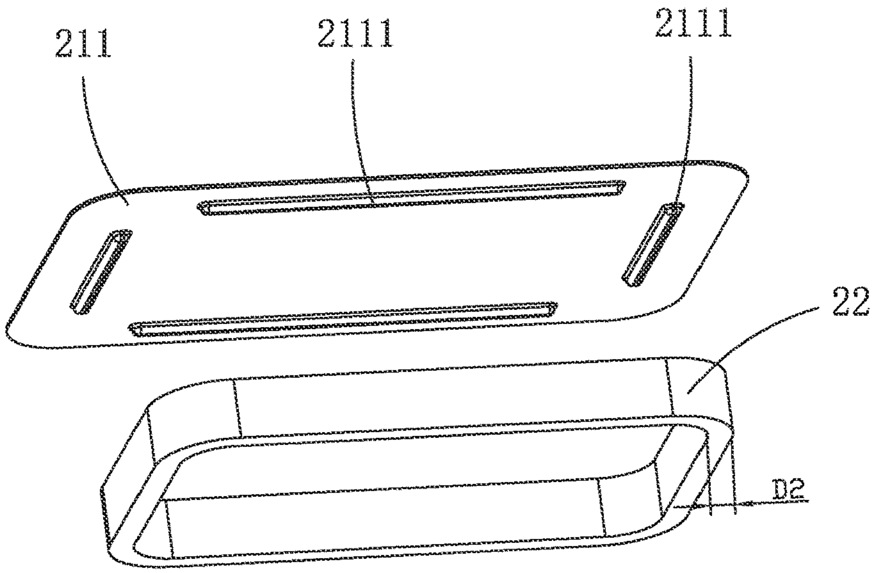
FIG. 6 is an isometric view of an assembly of a dome and a voice coil of the sounding unit in the present invention.
Figure 7:
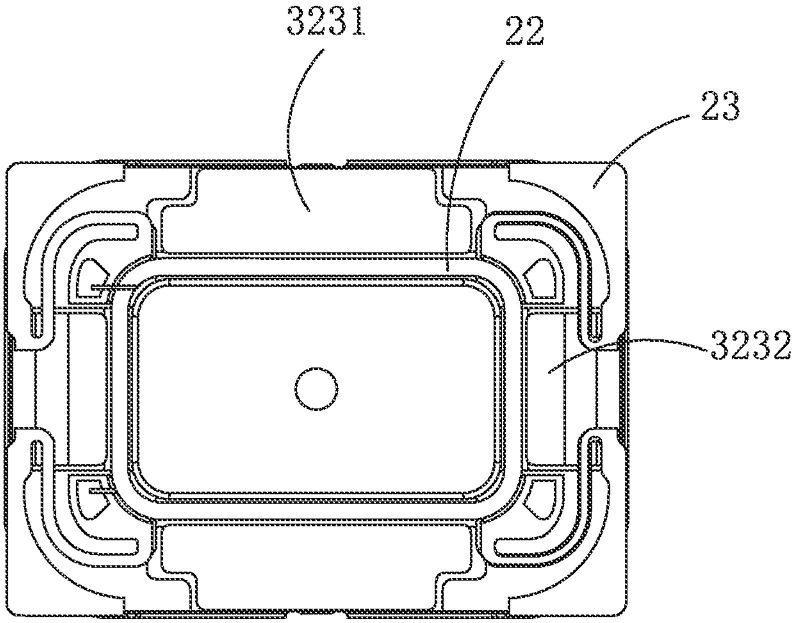
FIG. 7 is an isometric view of the sounding unit.
Figure 8:
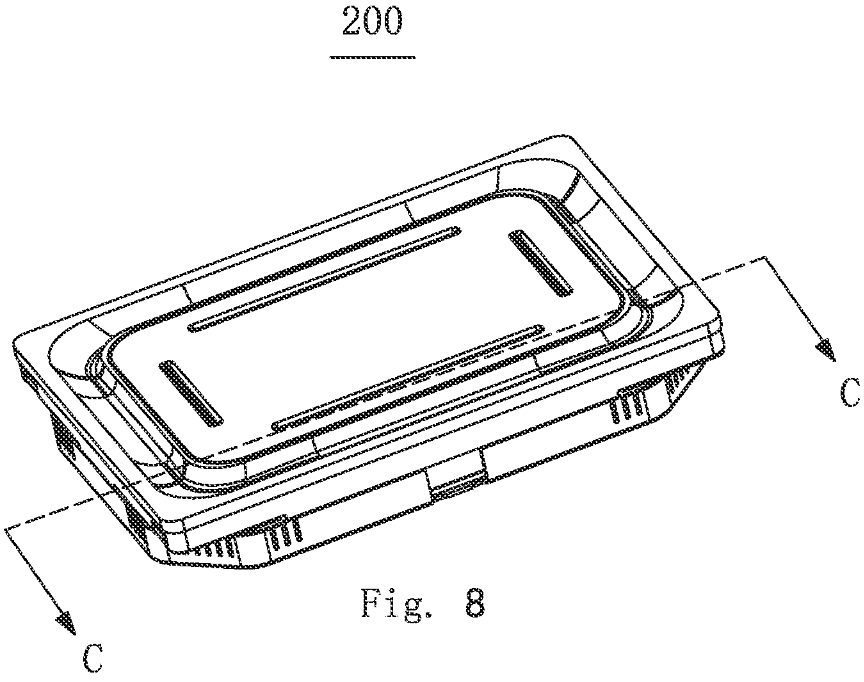
FIG. 8 is an isometric view of a sounding unit in accordance with another embodiment of the present invention.
Figure 9:
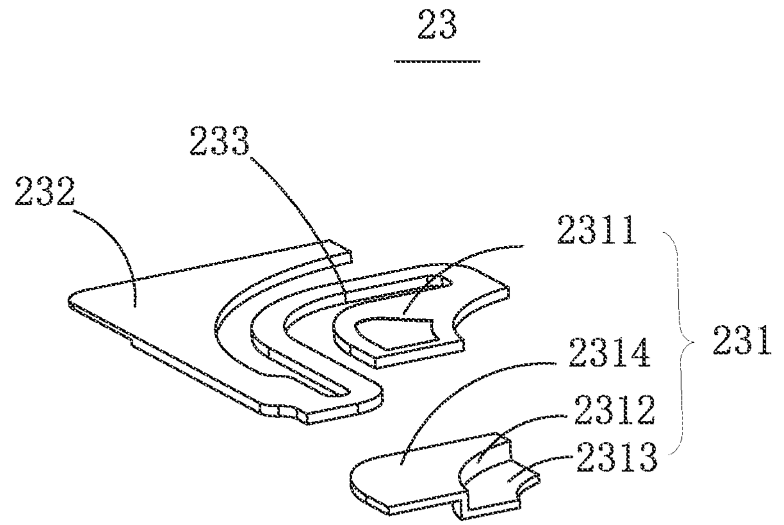
FIG. 9 is an isometric view of an FPC of the sounding unit in FIG. 8.
Figure 10:
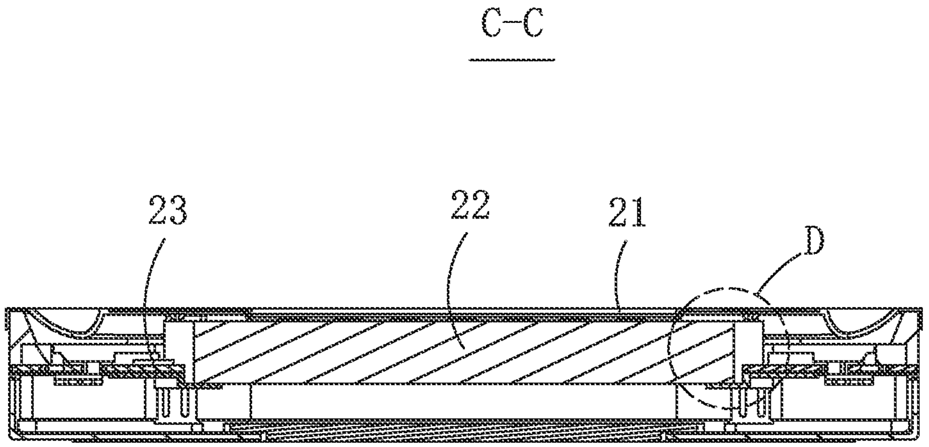
FIG. 10 is a cross-sectional view pf the speaker unit taken along line CC in FIG. 8.
Figure 11:
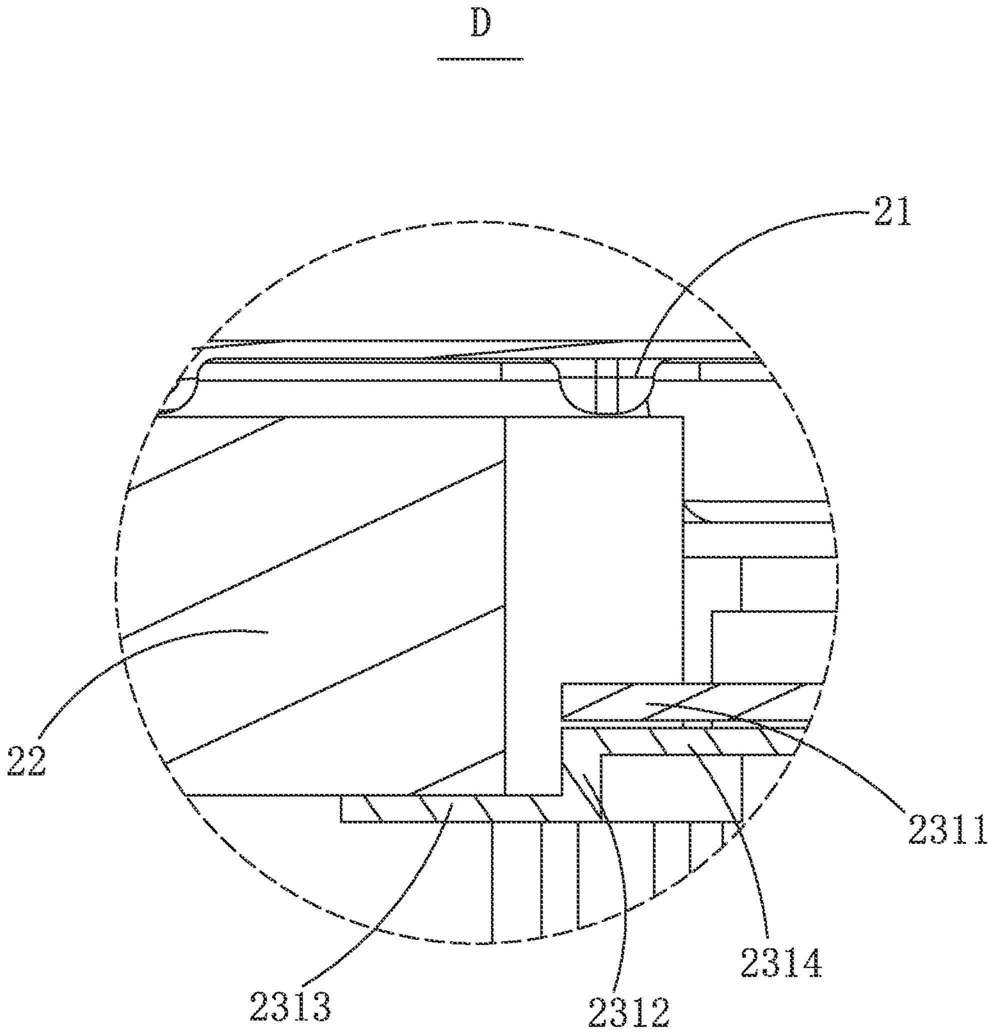
FIG. 11 is an enlarged view of Part D of FIG. 10.

Specifically, as shown in FIG. 6, in this embodiment, there are four protruded platforms 2111. The long axis direction of the voice coil 22 is fixed to one of the protruded platforms 2111, and the short axis direction of the voice coils 22 are fixed to each of the protruded platforms 2111. In other embodiments, the protruded platform 2111 may also be annular, or may be a plurality of pieces spaced along the long axis direction and the short axis direction of the voice coil 22, which is not limited herein.

In order to further ensure the vibration stability of the voice coil 22, the vibration system 2 further includes an FPC 23 fixed to the end of the voice coil 22 away from the diaphragm 21. Specifically, as shown in FIG. 2-FIG. 5, the FPC 23 includes an internal fixed part 231 fixed to the voice coil 22 and an external fixed part 232 fixed to the frame 1, an elastic part 233 connecting the internal fixed part 231 and the external fixed part 232. The internal fixed part 231 includes a first fixed part 2311 connected to the elastic part 233, and a second fixed part 2312 bent and extended from the first fixed part 2311 in a direction away from the diaphragm 21 and a third fixed part 2313 bent and extended from the end of the second fixed part 2312 away from the first fixed part 2311 toward the voice coil 22.

Different from the prior art in which the FPC is only fixed to the side surface of the voice coil, in this embodiment, the lower end surface 222 of the voice coil 22 is fixed to the surface of the third fixed part 2313 facing the diaphragm 21, that is, the third fixed part 2313 of the FPC23 supports the bottom of the voice coil 22. The voice coil 22 and the FPC 23 is improved to avoid separation and improve the vibration stability of the vibration system 2. The purpose is to support the voice coil 22 more uniformly. Four FPCs 23 are arranged, that is, the four third fixed parts 2313 are respectively fixed to the four corner positions of the voice coil 22. The third fixed part 2313 extends into the containment gap 3233 contained in the magnetic circuit system 3. Besides, the sounding unit 100 also includes a conductive terminal 5. The welding plate 23111 is provided on the surface of the first fixed part 2311 of the FPC23 facing the diaphragm 21. The voice coil 22 is connected to the welding plate 23111 through the conductive terminal 5, and is then electrically connected to the external circuit through the FPC23.

More preferably, a thickness of the voice coil 22 is smaller than the width of the third fixed part 2313. That is, the third fixed part 2313 can completely cover the lower end surface 222 of the voice coil 22 along the thickness direction of the voice coil 22. It can be understood that the thickness of the voice coil 22 is shown as d2 in FIG. 6, and the width of the third fixed part 2313 is shown as d1 in FIG. 3. On this basis, the second fixed part 2312 is spaced apart from the surface of the voice coil 22 away from the main magnet 321 to form a glue groove for accommodating the glue, and is filled with the glue. The bonding strength between voice coil 22 and FPC23 is further improved.

In this embodiment, the first fixed part 2311, the second fixed part 2312 and the third fixed part 2313 are integrally formed, and the entire FPC 23 is made of a uniform material.

As shown in FIGS. 8-11, in the sounding unit 200 provided by another embodiment, the only difference is that the FPC23 further includes a fourth fixed part 2314 fixed to the surface of the first fixed part 2311 away from the diaphragm 21. The second fixed part 2312, the third fixed part 2313 and the fourth fixed part 2314 are integrally formed. The fourth fixed part 2314 is glued to the surface of the first fixed part 2311 away from the diaphragm 21. It can be understood that the second fixed part 2312, the third fixed part 2313 and the fourth fixed part 2314 are integrally formed by a steel sheet in a bending manner, which is different from the material of the first fixed part 2311.

Compared with the related art, in the sounding unit of the present invention, a protruded platform formed by arranging depression on the dome of the diaphragm is used to fix and support the voice coil. In this way, the voice coil skeleton is not used, the overall weight of the vibration system is reduced, and the sound performance of the sounding unit is improved. In addition, the second fixed part and the third fixed part which are bent and extended at the fixed positions of the FPC and the voice coil are set, the second fixed part is spaced from the side surface of the voice coil to form a glue groove for accommodating the glue. The third fixed part carries the bottom of the voice coil, which effectively improves the bonding strength of the voice coil and the FPC, and avoids the risk of separation of the FPC and the voice coil.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding unit including:

a frame;

a vibration system including a diaphragm with a dome in a middle thereof and a suspension surrounding the dome, and a voice coil for driving the diaphragm to vibrate and generate sound;

an FPC fixed to one end of the voice coil away from the diaphragm, including an internal fixed part fixed on the voice coil, an external fixed part fixed on the frame and an elastic part connecting the internal fixed part and the external fixed part;

a magnetic circuit system including a yoke engaged with the frame, a magnet fixed on the yoke, and a magnetic gap; wherein the dome includes a protruded platform recessed from a surface of the dome away from the voice coil toward the voice coil;

the internal fixed part includes a first fixed part connected to the elastic part, a second fixed part bent and extended away from the diaphragm from the first fixed part, and a third fixed part bent and extended from an end of the second fixed part away from the first fixed part toward the voice coil;

the voice coil includes an upper end surface toward the diaphragm and a lower end surface away from the diaphragm; the upper end surface is fixed on the protruded platform, and the lower end surface is fixed on the third fixed part;

wherein the lower end surface is fixed to a surface of the third fixed part facing the voice coil.

2. The sounding unit as described in claim 1, wherein a thickness of the voice coil is smaller than a width of the third fixed part.

3. The sounding unit as described in claim 2, wherein the second fixed part is spaced apart from the surface of the voice coil away from the magnet to form a glue groove for accommodating glue.

4. The sounding unit as described in claim 3, wherein the first fixed part, the second fixed part and the third fixed part are integrally formed.

5. The sounding unit as described in claim 3, wherein the FPC further includes a fourth fixed part glued to the first fixed part away from the diaphragm; the second fixed part, the third fixed part and the fourth fixed part are integrally formed.

6. The sounding unit as described in claim 3, wherein the voice coil includes a plurality of protruded platforms extending along a long axis and a short axis of the voice coil, respectively.

7. The sounding unit as described in claim 6, wherein the third fixed part is fixed to a corner position of the voice coil.

8. The sounding unit as described in claim 7, wherein the magnet includes a main magnet located on a middle of the yoke, and an auxiliary magnet arranged on a peripheral side of the main magnet and forming the magnetic gap with the main magnet; the auxiliary magnet includes a first auxiliary magnet along the long axis of the voice coil and a second auxiliary magnet along the short axis of the voice coil; the first auxiliary magnet and the second auxiliary magnet are spaced apart for forming a containment gap for receiving at least a part of the third fixed part.

9. The sounding unit as described in claim 1, further including a conductive terminal; wherein a surface of the first fixed part facing the diaphragm includes a welding plate electrically connecting to the voice coil through the conductive terminal.

* * * * *